United States Patent [19]
Planche et al.

[11] Patent Number: 6,011,095
[45] Date of Patent: Jan. 4, 2000

[54] METHOD FOR PREPARING BITUMEN/POLYMER COMPOSITIONS AND USE THEREOF

[75] Inventors: Jean-Pascal Planche, St. Just Chaleyssin; Patrick Turello, Francheville; Claude Lacour, Vienne, all of France

[73] Assignee: ELF Antar France, Courbevoie, France

[21] Appl. No.: 08/981,330

[22] PCT Filed: May 6, 1997

[86] PCT No.: PCT/FR97/00812

§ 371 Date: Apr. 20, 1998

§ 102(e) Date: Apr. 20, 1998

[87] PCT Pub. No.: WO97/43342

PCT Pub. Date: Nov. 20, 1997

[30] Foreign Application Priority Data

May 10, 1996 [FR] France .................................. 96 05828

[51] Int. Cl.⁷ ............................. C08K 95/00; C08L 63/00
[52] U.S. Cl. ............................ 524/68; 523/351; 523/450; 524/59; 524/69; 524/70; 524/71
[58] Field of Search ................... 524/59, 68, 70, 524/71; 523/351, 450

[56] References Cited

U.S. PATENT DOCUMENTS

| | | | |
|---|---|---|---|
| 4,650,820 | 3/1987 | Decroix | 524/69 |
| 4,839,404 | 6/1989 | Chang et al. | 524/69 |
| 4,882,373 | 11/1989 | Moroih | 524/68 |
| 5,070,123 | 12/1991 | Moran | 524/59 |
| 5,095,055 | 3/1992 | Moran | 524/59 |
| 5,331,028 | 7/1994 | Goodrich | 524/59 |
| 5,519,073 | 5/1996 | van der Werff et al. | 524/59 |
| 5,556,900 | 9/1996 | Goodrich et al. | 524/59 |
| 5,565,510 | 10/1996 | Giavarini et al. | 524/59 |
| 5,576,363 | 11/1996 | Gallagher et al. | 524/59 |
| 5,604,274 | 2/1997 | Gallagher et al. | 524/59 |
| 5,618,862 | 4/1997 | Germanaud et al. | 524/59 |
| 5,756,565 | 5/1998 | Germanaud et al. | 524/59 |

*Primary Examiner*—Peter A. Szekely
*Attorney, Agent, or Firm*—Burgess, Ryan & Wayne

[57] ABSTRACT

Bitumen/polymer compositions are produced by contacting, between 100° C. and 230° C., under agitation, one bitumen or a mixture of bitumens with at least one olefinic polymer bearing epoxy or COOH groupings, then by incorporating in the product, an acid additive while the whole mixture is agitated at a range between 100° C. and 230° C. for at least 10 minutes. The product, which is subjected to treatment by the acid additive may still contain one or several additional polymers, for instance of the elastomer type cross-linkable with sulphur, and even be subjected to sulphur cross-linking before treatment. The bitumen/polymer compositions are useful directly or after dilution, to form binders for carrying out surfacing operations.

43 Claims, No Drawings

METHOD FOR PREPARING BITUMEN/POLYMER COMPOSITIONS AND USE THEREOF

BACKGROUND OF THE INVENTION

1) Field of the Invention

The invention relates to a process for the preparation of bitumen/polymer compositions with a very low temperature susceptibility. It further relates to the application of the compositions obtained to the production of bitumen/polymer binders for the preparation of coatings and in particular of road surfacings, of bituminous mixes or alternatively of watertight facings.

2) Background Art

It is known to use bituminous compositions as various surface coatings and in particular as road surface coatings, provided that these compositions possess a certain number of essential mechanical qualities.

These mechanical qualities are assessed, in practice, by determining, by standardized tests, a series of mechanical characteristics, the most widely used of which are as follows:

softening point, expressed in ° C. and determined by the ring-and-ball test defined by NF Standard T 66008, brittleness point or Fraass point, expressed in ° C. and determined according to IP Standard 80/53, penetrability, expressed in 1/10 of an mm and determined according to NF Standard T 66004, tensile rheological characteristics determined according to NF Standard T 46002 and comprising the quantities:

yield stress $\sigma_y$ in bars,
elongation at yield stress $\epsilon_y$ in %,
breaking stress $\sigma_b$ in bars,
elongation at break $\epsilon_y$ in %.

It is also possible to obtain an indication of the temperature susceptibility of bituminous compositions from a correlation between the penetrability (abbreviated to pen) and the softening point (abbreviated to RBT) of the said compositions known under the name of Pfeiffer number (abbreviated to PN).

This number is calculated from the relationship:

$$PN = \frac{20 - 500A}{1 + 50A}$$

in which A is the slope of the straight line represented by the equation:

$$A = \frac{\log_{10} 800 - \log_{10} pen}{RBT - 25}$$

The temperature susceptibility of the bituminous composition decreases as the value of the Pfeiffer number increases or, which comes to the same thing, as the value of the quantity A decreases. For conventional bitumens, the Pfeiffer number takes values lying in the vicinity of zero.

In general, conventional bitumens do not simultaneously exhibit all the required qualities and it has been known for a long time that the addition of varied polymers to these conventional bitumens makes it possible to favourably modify the mechanical properties of the latter and to form bitumen/polymer compositions having improved mechanical qualities with respect to those of the bitumens alone.

The incorporation of olefinic polymers functionalized by epoxy or carboxyl groups in bituminous compositions composed of one or more bitumens or composed of one or more bitumens and of one or more polymers not containing such groups results in the production of bitumen/polymer compositions with significantly improved consistency (increase in the ring-and-ball softening point), temperature susceptibility (increase in the Pfeiffer number) and tensile mechanical properties.

Such bitumen/polymer compositions, which contain olefinic polymers functionalized by epoxy or carboxyl groups, are described in particular in the references U.S. Pat. Nos. 4,650,820, 5,306,750 and 5,331,028, as well as in the French patent application filed by the Applicant Company on Oct. 11, 1994 under the number 9413537. Thus, the reference U.S. Pat. No. 4,650,820 relates to a bitumen/polymer composition containing, by weight, 95% to 99% of a bitumen having a pseudoviscosity at 30° C. lying in the range 200 to 1000 seconds and 1% to 5% of a terpolymer composed of 88% to 98.7%, on a molar basis, of units deriving from ethylene, of 1% to 10%, on a molar basis, of units deriving from at least one $C_1$ to $C_6$ alkyl acrylate or methacrylate and of 0.3% to 3% of units deriving from maleic anhydride. The reference U.S. Pat. No. 5,306,750 describes a bitumen/polymer composition consisting of a reaction product obtained by bringing a bitumen into contact, at temperatures of 125° C. to 250° C. and with stirring for a period of time of the order of 3 hours to 48 hours, with an ethylene copolymer containing, by weight, 0.1% to 20% of glycidyl groups, the amount of the copolymer representing 0.05% to 20% of the weight of the composition. In particular, the ethylene copolymer containing glycidyl groups is a random copolymer of ethylene, of 0.5 to 15% by weight of a monomer containing a glycidyl group, in particular glycidyl acrylate or methacrylate, and of 0 to 50% by weight of a vinyl monomer without glycidyl group, such as a vinyl ester, such as vinyl acetate, or an alkyl acrylate or methacrylate. The reference U.S. Pat. No. 5,331,028 relates to a bitumen/polymer composition of a type comparable to that described in the reference U.S. Pat. No. 5,306,750 but additionally containing 0.3% to 20% by weight of a block copolymer of styrene and of a conjugated diene, for example block copolymer of styrene and of butadiene, having a weight-average molecular mass ranging from 100,000 to 1,000,000. The subject of French Patent Application No. 9413537 is a bitumen/polymer composition obtained by bringing a bitumen or mixture of bitumens, a sulphur-crosslinkable elastomer, such as, in particular, a block copolymer of styrene and of a conjugated diene, an olefinic polymer containing epoxy or carboxyl (COOH) functional groups and a sulphur-donor coupling agent into contact between 100° C. and 230° C., with stirring.

SUMMARY OF THE INVENTION

It has now been found that the beneficial effect of olefinic polymers containing epoxy or COOH functional groups on the improvement in the mechanical and rheological characteristics, in particular consistency, temperature susceptibility and tensile mechanical properties, of bitumen/polymer compositions containing these functional polymers can still be substantially improved by treating the said compositions, after they have been obtained, with a specific adjuvant of the acid or acid anhydride type.

The subject of the invention is thus a process for the preparation of bitumen/polymer compositions exhibiting, inter alia, a very low temperature susceptibility, in which a bitumen or mixture of bitumens is brought into contact, the operation being carried out at temperatures between 100° C. and 230° C. and with stirring for a time of at least 10 minutes, with, with respect to the weight of the bitumen or mixture of bitumens, 0.01% to 20%, preferably 0.05% to 10% and more especially 0.1% to 6% of at least one olefinic polymer carrying epoxy or COOH functional groups, in order to form a so-called bitumen/polymer component reaction product, the said process being characterized in that the bitumen/polymer component, maintained at temperatures of between 100° C. and 230° C. and with stirring, has incorporated in it 0.005% to 6% and preferably 0.01% to 3%, by weight of the bitumen or mixture of bitumens, of an acidic adjuvant and the reaction mixture thus formed is maintained at temperatures of between 100° C. and 230° C. and with stirring for a time of at least 10 minutes in order to produce the bitumen/polymer composition, the said acidic adjuvant being composed of one or more compounds chosen from the group formed by phosphoric acids, boric acids, sulphuric acid, the anhydrides of the said acids, chlorosulphuric acid, polyphosphoric acids, phosphonic acids of formula

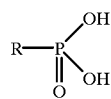

and acids of formula R—(COO)$_t$—SO$_3$H with, in the said formulae, t taking the value of zero or one and R denoting a monovalent hydrocarbon radical chosen from the group composed of $C_1$ to $C_{16}$ acyclic monovalent hydrocarbon radicals and cyclic monovalent hydrocarbon radicals containing 4 to 12 cyclic carbon atoms and optionally substituted by $C_1$ to $C_{16}$ acyclic monovalent hydrocarbon radicals.

DESCRIPTION OF THE PREFERRED EMBODIMENTS

In particular, the acidic adjuvant can be taken from the compounds $H_3PO_4$, $P_2O_5$, $H_3BO_3$, $B_2O_3$, $H_2SO_4$, $SO_3$ and $HSO_3Cl$ or alternatively from polyphosphoric acids, mixtures of at least one polyphosphoric acid and of sulphuric acid, mixtures of at least one polyphosphoric acid and of at least one of the said acids R—(COO)$_t$—SO$_3$H, mixtures of sulphuric acid and of at least one of the acids R—(COO)$_t$—SO$_3$H, and mixtures of sulphuric acid with at least one polyphosphoric acid and at least one of the acids R—(COO)$_t$—SO$_3$H. When the acidic adjuvant is based on one or more polyphosphoric acids, it can contain, by weight, 5% to 100% and more particularly 20% to 100% of one or more polyphosphoric acids and 95% to 0% and more particularly 80% to 0% of at least one compound chosen from the group formed of sulphuric acid and acids R—(COO)$_t$—SO$_3$H. This type of acidic adjuvant is very especially composed of a combination comprising, by weight, from 20% to 95% and more particularly from 40% to 90% of one or more polyphosphoric acids and from 80% to 5% and more particularly from 60% to 10% of sulphuric acid and/or of methanesulphonic acid.

When the acidic adjuvant is composed of a plurality of acidic compounds, the said compounds can be incorporated in the bitumen/polymer component either as a mixture or separately.

The polyphosphoric acids which can be used in the process according to the invention are compounds of empirical formula $P_qH_rO_s$ in which q, r and s are positive numbers such that $q \geq 2$ and in particular ranging from 3 to 20 or more and such that $5q+r-2s=0$.

In particular, the said polyphosphoric acids can be linear compounds of empirical formula $P_qH_{q+2}O_{3q+1}$ corresponding to the expanded formula

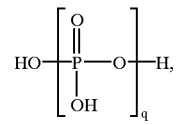

where q has the meaning given above, or can alternatively be products with a two-dimensional structure, indeed even three-dimensional structure. All these polyphosphoric acids can be regarded as polycondensation products from heating aqueous metaphosphoric acid.

The acids of formula R—(COO)$_t$—SO$_3$H are either sulphonic acids of formula R—SO$_3$H, when t=0, or else acids of formula R—COO—SO$_3$H, when t=1. The acids of formula R—COO—SO$_3$H can be regarded as adducts of monocarboxylic acids R—COOH and of SO$_3$ or alternatively as mixed anhydrides of monocarboxylic acids of formula R—COOH and of sulphuric acid.

The monovalent hydrocarbon radical R which appears in the formula of the phosphonic acids

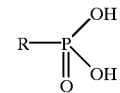

and in the formula of the acids R—(COO)$_t$—SO$_3$H is chosen, as indicated above, from $C_1$ to $C_{16}$ acyclic monovalent hydrocarbon radicals and cyclic monovalent hydrocarbon radicals which contain 4 to 12 cyclic carbon atoms and which are optionally substituted by $C_1$ to $C_{16}$ acyclic monovalent hydrocarbon radicals. Thus, the radical R of acyclic type can comprise, in particular, a linear or branched $C_1$ to $C_{16}$ alkyl radical, for example, such as methyl, ethyl, propyl, butyl, hexyl, heptyl, octyl, decyl, dodecyl or alternatively tetradecyl. The radical R of cyclic type can comprise, in particular, a $C_4$ to $C_{12}$ cycloalkyl radical and more particularly a $C_5$ to $C_8$ cycloalkyl radical, such as cyclopentyl, cyclohexyl, cycloheptyl or cyclooctyl, or else a monovalent aromatic radical which contains 6 cyclic carbon atoms and which can optionally be substituted by a linear or branched $C_1$ to $C_{16}$ alkyl radical, such as, for example, a phenyl, tolyl, decylphenyl, dodecylphenyl or tetradecylphenyl radical.

Examples of sulphonic acids of formula R—SO$_3$H which can be used in the process according to the invention are methanesulphonic acid, ethanesulphonic acid, propanesulphonic acid, benzenesulphonic acid, toluenesulphonic acid, decylbenzenesulphonic acid, dodecylbenzenesulphonic acid and tetradecylbenzenesulphonic acid.

Examples of phosphonic acids of formula

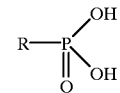

which can be used in the process according to the invention are methylphosphonic acid, ethylphosphonic acid, propylphosphonic acid, butylphosphonic acid and phenylphosphonic acid.

Mention may be made, as acids of formula R—COO—SO$_3$H, of the acids CH$_3$—COO—SO$_3$H and CH$_3$—CH$_2$—

COO—SO$_3$H, which are adducts of SO$_3$ with acetic acid and propionic acid respectively.

The olefinic polymers carrying epoxy or COOH functional groups, at least one of which is incorporated in the bitumen or mixture of bitumens in order to form the bitumen/polymer component, advantageously comprise olefinic copolymers containing, by weight, x % of units resulting from ethylene or from propylene, y % of units resulting from one or more monomers A of formula

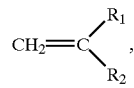

z % of units resulting from at least one monomer B of formula

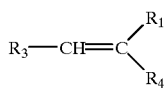

and v % of units resulting from one or more monomers C other than the monomers A and B, with, in these formulae, R$_1$ denoting H, CH$_3$ or C$_2$H$_5$, R$_2$ representing a —COOR$_5$, —OR$_5$ or —OOCR$_6$ radical with R$_5$ denoting a C$_1$ to C$_{10}$ alkyl radical and preferably a C$_1$ to C$_6$ alkyl radical and R$_6$ representing H or a C$_1$ to C$_3$ alkyl radical, R$_3$ denoting H, COOH or COOR$_5$, R$_5$ having the abovementioned definition, and R$_4$ denoting a —COOH,

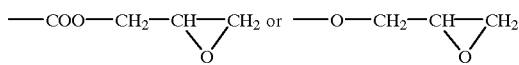

radical and x, y, z and v being numbers such that 40<x<99.9, 0<y<50, 0.1<z<20 and 0<v<15 with x+y+z+v=100.

Preferably, in the abovementioned copolymers, x, y, z and v are such that 50<x<99.5, 0<y<40, 0.5<z<15 and 0<v<10 with x+y+z+v=100.

The monomers A of formula

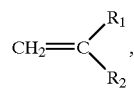

which supply

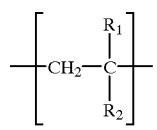

units in the olefinic copolymer, are chosen in particular from vinyl formate, vinyl acetate, vinyl propionate, vinyl butyrate, vinyl ethers CH$_2$=CH—O—R$_5$, where R$_5$ is a C$_1$ to C$_{10}$ and preferably C$_1$ to C$_6$ alkyl radical, such as methyl, ethyl, propyl or butyl, or alkyl acrylates and methacrylates of formula CH$_2$=CH—COOR$_5$ and

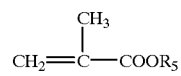

respectively, where R$_5$ has the meaning given above.

The monomers B of formula

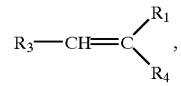

which provide

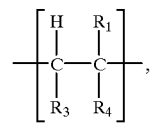

units in the olefinic copolymer, are chosen in particular from maleic acid and its anhydride, acrylic acid, methacrylic acid, alkyl hydrogen maleates of formula HOOC—CH=CH—COOR$_7$, where R$_7$ is a C$_1$ to C$_6$ alkyl radical, such as methyl, ethyl, propyl or butyl, glycidyl acrylates and methacrylates of formula

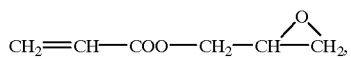

and

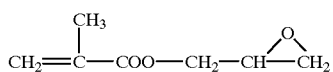

respectively, vinyl alcohol and glycidyl vinyl ether of formula

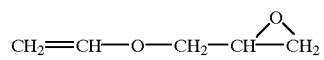

The monomers C, the presence of which in the olefinic copolymer is optional, are monomers which can be polymerized by the radical route other than the monomers A and B, such as, for example, CO, SO$_2$ and acrylonitrile.

In particular, the olefinic copolymers carrying epoxy or COOH functional groups are chosen from:

(a) random copolymers of ethylene and of a monomer B chosen from acrylic acid, methacrylic acid, maleic acid or its anhydride, glycidyl acrylate and glycidyl methacrylate which contain, by weight, 80% to 99.7% and preferably 85% to 99.5% of ethylene;

(b) random terpolymers of ethylene, of a monomer A chosen from vinyl acetate and alkyl acrylates or methacrylates containing a C$_1$ to C$_6$ alkyl residue, such as methyl, ethyl, propyl, butyl or hexyl, and of a monomer B chosen from acrylic acid, methacrylic acid, maleic acid or its anhydride, glycidyl acrylate and glycidyl methacrylate which contain, by weight, 0.5% to 40% of units resulting from the monomer A and 0.5% to 15% of units resulting from the monomer B, the remainder being formed of units resulting from ethylene; and (c) copolymers resulting from the grafting of a monomer B, chosen from acrylic acid, methacrylic acid, maleic acid or its anhydride, glycidyl acrylate and glycidyl methacrylate, on a substrate composed of a polymer chosen from polyethylenes, in particular low density polyethylenes, polypropylenes and random copolymers of ethylene and of vinyl acetate or of ethylene and of alkyl acrylate or methacrylate containing a $C_1$ to $C_6$ alkyl residue, such as methyl, ethyl, propyl, butyl or hexyl, which contain, by weight, 40% to 99.7% and preferably 50% to 99% of ethylene, the said grafted copolymers containing, by weight, 0.5% to 15% of grafted units resulting from the monomer B.

The olefinic copolymers chosen from:
(i) random terpolymers of ethylene, of alkyl acrylate or methacrylate containing a $C_1$ to $C_6$ alkyl residue, such as methyl, ethyl or butyl, and of maleic anhydride which contain, by weight, 0.5% to 40% of units resulting from alkyl acrylate or methacrylate and 0.5% to 15% of units resulting from maleic anhydride, the remainder being formed of units resulting from ethylene;
(ii) random terpolymers of ethylene, of alkyl acrylate or methacrylate containing a $C_1$ to $C_6$ alkyl residue, such as methyl, ethyl or butyl, and of glycidyl acrylate or methacrylate which contain, by weight, 0.5% to 40% of units resulting from alkyl acrylate or methacrylate and 0.5% to 15% of units resulting from glycidyl acrylate or methacrylate, the remainder being formed of units resulting from ethylene;
(iii) low density polyethylenes grafted with maleic anhydride and polypropylenes grafted with maleic anhydride which contain, by weight, 0.5% to 15% of grafted units resulting from maleic anhydride;
(iv) low density polyethylenes grafted with glycidyl acrylate or methacrylate and polypropylenes grafted with glycidyl acrylate or methacrylate which contain, by weight, 0.5% to 15% of grafted units resulting from the glycidyl derivative, are particularly preferred.

The olefinic copolymers carrying epoxy or COOH functional groups used to produce the bitumen/polymer component advantageously have molecular masses such that the melt flow index of the said copolymers, determined according to ASTM Standard D 1238 (test carried out at 190° C. under a load of 2.16 kg), has a value, expressed in grams per 10 minutes, of between 0.3 and 3000 and preferably between 0.5 and 900.

The bitumen or mixture of bitumens which is employed for the implementation of the process according to the invention is advantageously chosen from the various bitumens which have a kinematic viscosity at 100° C. of between $0.5 \times 10^{-4}$ m²/s and $3 \times 10^{-2}$ m²/s and preferably between $1 \times 10^{-4}$ m²/s and $2 \times 10^{-2}$ m²/s. These bitumens may be direct distillation or vacuum distillation bitumens or else blown or semiblown bitumens, propane or pentane deasphalting residues, viscosity breaking residues, indeed even some petroleum cuts or mixtures of bitumens and of vacuum distillates or alternatively mixtures of at least two of the products which have just been listed. Besides a kinematic viscosity included within the abovementioned ranges, the bitumen or mixture of bitumens employed in the process according to the invention advantageously has a penetrability at 25° C., defined according to NF Standard T 66004, of between 5 and 800 and preferably between 10 and 400.

In addition to the olefinic polymer functionalized by epoxy or COOH groups, the bitumen/polymer component, which is treated with the acidic adjuvant, can also contain one or more additional polymers other than the said functionalized olefinic polymer, the said additional polymer(s) being in particular elastomers and especially sulphur-crosslinkable elastomers. These elastomers are advantageously chosen from random or block copolymers of styrene and of a conjugated diene, such as butadiene, isoprene, chloroprene, carboxylated butadiene or carboxylated isoprene, and more particularly are composed of one or more copolymers chosen from block copolymers, with or without a random hinge, of styrene and of butadiene, of styrene and of isoprene, of styrene and of chloroprene, of styrene and of carboxylated butadiene or alternatively of styrene and of carboxylated isoprene. The copolymer of styrene and of conjugated diene, and in particular each of the abovementioned copolymers, advantageously has a styrene content by weight ranging from 5% to 50%. The weight-average molecular mass of the copolymer of styrene and of conjugated diene, and in particular that of the abovementioned copolymers, can be, for example, between 10,000 and 600,000 daltons and preferably lies between 30,000 and 400,000 daltons. The copolymer of styrene and of conjugated diene is preferably chosen from di- or triblock copolymers of styrene and of butadiene, of styrene and of isoprene, of styrene and of carboxylated butadiene or alternatively of styrene and of carboxylated isoprene which have styrene contents and weight-average molecular masses which lie within the ranges defined above.

The amount of the additional polymer or polymers and in particular the amount of the sulphur-crosslinkable elastomer or elastomers in the bitumen/polymer component can be between 0.3% and 20% and preferably between 0.5% and 10% of the weight of the bitumen in the said component.

The bitumen/polymer component, which contains a sulphur-crosslinkable elastomer in addition to the olefinic polymer functionalized by epoxy or COOH groups, can advantageously be subjected to crosslinking under the action of a sulphur-donor coupling agent in order to form a crosslinked bitumen/polymer component which constitutes the bitumen/polymer component subjected to treatment by the acidic adjuvant.

The sulphur-donor coupling agent which is employed in the preparation of the crosslinked bitumen/ polymer component can be composed of a product chosen from the group formed by elemental sulphur, hydrocarbyl polysulphides, sulphur-donor vulcanization accelerators or mixtures of such products with one another and/or with vulcanization accelerators which are not sulphur donors. In particular, the sulphur-donor coupling agent is chosen from the products M, which contain, by weight, from 0% to 100% of a component CA composed of one or more sulphurdonor vulcanization accelerators and from 100% to 0% of a component CB composed of one or more vulcanizing agents chosen from elemental sulphur and hydrocarbyl polysulphides, and the products N, which contain a component CC composed of one or more vulcanization accelerators which are not sulphur donors and a product M in a ratio by weight of the component CC to the product M ranging from 0.01 to 1 and preferably from 0.05 to 0.5.

The elemental sulphur capable of being employed for constituting, partially or entirely, the coupling agent is advantageously sulphur in flower form and preferably sulphur crystallized in the orthorhombic form and known by the name of alpha sulphur.

The hydrocarbyl polysulphides capable of being employed to form part or all of the coupling agent may be chosen from those which are defined in the citation FR-A-2,528,439 and which correspond to the general formula $R_8$—$(S)_m$—$(R_9$—$(S)_m)_w$—$R_{10}$ in which $R_8$ and $R_{10}$ each denote a saturated or unsaturated, $C_1$ to $C_{20}$ monovalent hydrocarbon radical or are connected to one another to constitute a saturated or unsaturated, $C_1$ to $C_{20}$ divalent hydrocarbon radical forming a ring with the other groups of atoms associated in the formula, $R_9$ is a saturated or unsaturated, $C_1$ to $C_{20}$ divalent hydrocarbon radical, the—$(S)_m$—groups represent divalent groups each formed from m sulphur atoms, the values m being able to differ from one of the said groups to another and denoting integers ranging from 1 to 6 with at least one of the values of m equal to or greater than 2 and w represents an integer assuming values from zero to 10. Preferred polysulphides correspond to the formula $R_{11}$—$(S)_p$—$R_{11}$, in which $R_{11}$, denotes a $C_6$ to $C_{16}$ alkyl radical, for example hexyl, octyl, dodecyl, tert-dodecyl, hexadecyl, nonyl or decyl, and—$(S)_p$—represents a divalent group formed from a chain sequence of p sulphur atoms, p being an integer ranging from 2 to 5.

When the coupling agent contains a sulphur-donor vulcanization accelerator, the latter may be chosen in particular from the thiuram polysulphides of formula

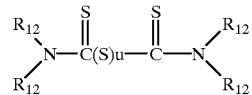

in which the symbols $R_{12}$, which are identical or different, each represent a $C_1$ to $C_{12}$ and preferably $C_1$ to $C_8$ hydrocarbon radical, especially an alkyl, cycloalkyl or aryl radical, or else two $R_{12}$ radicals attached to the same nitrogen atom are bonded together to form a $C_2$ to $C_8$ divalent hydrocarbon radical and u is a number ranging from 2 to 8. As examples of such vulcanization accelerators, there may be mentioned especially the compounds: dipentamethylenethiuram disulphide, dipentamethylenethiuram tetrasulphide, dipentamethylenethiuram hexasulphide, tetrabutylthiuram disulphide, tetraethylthiuram disulphide and tetramethylthiuram disulphide.

As other examples of sulphur-donor vulcanization accelerators, there may also be mentioned alkylphenol disulphides and disulphides such as morpholine disulphide and N,N'-caprolactam disulphide.

Vulcanization accelerators which are not sulphur donors and which can be employed for forming the component CC of the coupling agents of product N type may be sulphur compounds chosen especially from mercaptobenzothiazole and its derivatives, especially benzothiazole metal thiolates and above all benzothiazolesulphenamides, dithiocarbamates of formula

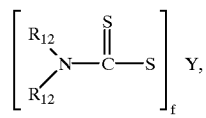

Y, in which the symbols $R_{12}$, which are identical or different, have the meaning given above, Y represents a metal and f denotes the valency of Y, and thiuram monosulphides of formula

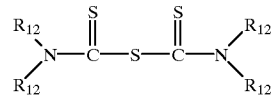

in which the symbols $R_{12}$ have the meaning given above.

Examples of vulcanization accelerators of the mercaptobenzothiazole type can be mercaptobenzothiazole, benzothiazolethiolate of a metal such as zinc, sodium or copper, benzothiazyl disulphide, 2-benzothiazolepentamethylenesulphenamide, 2-benzothiazolethiosulphenamide, 2-benzothiazoledihydrocarbylsulphenamides in the case of which the hydrocarbyl radical is an ethyl, isopropyl, tert-butyl or cyclohexyl radical, and N-oxydiethylene-2-benzothiazolesulphenamide.

Among the vulcanization accelerators of the dithiocarbamate type of the abovementioned formula, there may be mentioned the compounds which are dimethyldithiocarbamates of metals such as copper, zinc, lead, bismuth and selenium, diethyldithiocarbamates of metals such as cadmium and zinc, diamyldithiocarbamates of metals such as cadmium, zinc and lead, and lead or zinc pentamethylenedithiocarbamate.

By way of examples of thiuram monosulphides which have the formula given above, there may be mentioned compounds such as dipentamethylenethiuram monosulphide, tetramethylthiuram monosulphide, tetraethylthiuram monosulphide and tetrabutylthiuram monosulphide.

Other vulcanization accelerators which are not sulphur donors and which do not belong to the classes defined above may also be employed. Such vulcanization accelerators can be 1,3-diphenylguanidine, di-orthotolylguanidine and zinc oxide, the latter compound being used optionally in the presence of fatty acid.

For further details on the sulphur-donor vulcanization accelerators and those which are not sulphur donors which can be used in the formation of the coupling agent, reference may be made to citations EP-A-0,360,656 and EP-A-0,409,683, the contents of which are incorporated in the present description by reference, as are the contents of citation FR-A-2,528,439.

As follows from its composition, as indicated above, the coupling agent may be of the single-component or of the multicomponent type, it being possible for the coupling agent of the multicomponent type to be formed before it is used or alternatively produced in situ in the mixture in which it must be present. The coupling agent of the preformed multicomponent type or of the single-component type or the components of the coupling agent of the multicomponent type formed in situ may be used as they are, for example in the molten state, or else as a mixture, for example in solution or in suspension, with a diluent, for example a hydrocarbon compound.

The coupling agent is used in an amount appropriate for providing an amount of free sulphur representing 0.1% to 20% and preferably 0.5% to 10% of the weight of sulphur-crosslinkable elastomer in the bitumen/polymer component which is subjected to crosslinking by the coupling agent.

The bitumen/polymer component, which is subjected to the action of the acidic adjuvant, is prepared by bringing the olefinic polymer carrying epoxy or carboxyl functional groups and, if appropriate, the additional polymer or polymers, for example sulphur-crosslinkable elastomer, into contact with the bitumen or mixture of bitumens, in proportions chosen within the ranges defined above, the operation being carried out at temperatures of between 100° C. and 230° C., more particularly between 120° C. and 190° C., and with stirring, for a period of time of at least 10 minutes, generally of the order of a few tens of minutes to a few hours and for example from 10 minutes to 8 hours and more particularly from 10 minutes to 5 hours, to form a reaction product constituting the bitumen/polymer component. When an additional polymer, for example a sulphur-crosslinkable elastomer, is used in addition to the olefinic polymer functionalized by epoxy or COOH groups, the said additional polymer can be brought into contact with the bitumen or mixture of bitumens before or after the functionalized olefinic polymer or even at the same time as the latter.

When it is desired to produce a crosslinked bitumen/polymer component, a non-crosslinked bitumen/polymer component composed of a bitumen or mixture of bitumens containing at least one olefinic polymer carrying epoxy or COOH functional groups and at least one sulphur-crosslinkable elastomer, for example a block copolymer of styrene and of a conjugated diene, is first of all formed, the operation being carried out as indicated above, the sulphur-donor coupling agent is then incorporated in the said non-crosslinked bitumen/polymer component, in an appropriate amount chosen within the ranges defined above for the said amount, and the whole mixture is kept stirring at temperatures of between 100° C. and 230° C., more particularly between 120° C. and 190° C., and identical or not to the temperatures for the preparation of the non-crosslinked bitumen/polymer component, for a period of time of at least 10 minutes and generally ranging from 10 minutes to 5 hours, more particularly from 30 minutes to 3 hours, to form a reaction mass constituting the sulphur-crosslinked bitumen/polymer component.

The non-crosslinked or crosslinked bitumen/polymer component is treated with the acidic adjuvant by incorporating the said acidic adjuvant, in an appropriate amount chosen within the ranges defined above for the said amount, in the said bitumen/polymer component, maintained at temperatures of between 100° C. and 230° C., more particularly between 120° C. and 190° C., and with stirring, and by then maintaining the whole mixture at temperatures of between 100° C. and 230° C., more particularly between 120° C. and 190° C., and with stirring, for a period of time of at least 10 minutes and in particular from 10 minutes to 5 hours, more particularly from 30 minutes to 4 hours, to produce the bitumen/polymer composition with a very low temperature susceptibility.

During its formation, the bitumen/polymer component of the non-crosslinked type or of the sulphur-crosslinked type, which is subsequently subjected to the action of the acidic adjuvant, may further have added to it 1% to 40% and more particularly 2% to 30%, by weight of the bitumen, of a fluxing agent which may be composed, in particular, of a hydrocarbon oil exhibiting an atmospheric pressure distillation range, determined according to ASTM Standard D 86-67, of between 100° C. and 600° C. and lying more especially between 150° C. and 400° C. This hydrocarbon oil, which can especially be a petroleum cut of aromatic nature, a petroleum cut of naphtheno-aromatic nature, a petroleum cut of naphtheno-paraffinic nature, a petroleum cut of paraffinic nature, a coal oil or alternatively an oil of plant origin, is sufficiently "heavy" to limit the evaporation at the time of its addition to the bitumen and, at the same time, sufficiently "light" to be removed as much as possible after the bitumen/polymer composition containing it has been spread, so as to regain the same mechanical properties which the bitumen/polymer composition prepared without employing any fluxing agent would have exhibited after hot spreading. The fluxing agent can be added to the reaction mixture, which is formed from the bitumen, from the sulphur-crosslinkable elastomer and from the sulphurdonor coupling agent, at any time in the formation of the said reaction mixture, the amount of fluxing agent being chosen, within the range defined above, in order to be compatible with the desired final use on the work site.

The reaction mixture based on bitumen or mixture of bitumens, on olefinic polymer carrying epoxy or COOH functional groups and, when they are used, on additional polymer, such as, for example, sulphur-crosslinkable elastomer and sulphur-donor coupling agent, which gives rise to the non-crosslinked or crosslinked bitumen/polymer component which is subsequently treated with the acidic adjuvant, can also contain one or more additives capable of reacting with the epoxy or COOH groups of the functionalized olefinic polymer. These reactive additives can be, in particular, primary or secondary amines, especially polyamines, alcohols, especially polyols, acids, especially polyacids, or alternatively metal salts.

Reactive additives of the amine type are, for example, aromatic diamines, such as 1,4-diaminobenzene, 2,4-diaminotoluene, diaminonaphthalene, bis(4-aminophenyl) sulphone, bis(4-aminophenyl) ether or bis(4-aminophenyl) methane, aliphatic or cycloaliphatic diamines, such as those of formula $H_2N-R_{13}-NH_2$, where $R_{13}$ denotes a $C_2$ to $C_{12}$ alkylene or $C_6$ to $C_{12}$ cycloalkylene radical, for example ethylenediamine, diaminopropane, diaminobutane, diaminohexane, diaminooctane, diaminodecane, diaminododecane, diaminocyclohexane, diaminocyclooctane or diaminocyclododecane, polyethylenepolyamines or polypropylenepolyamines, such as diethylenetriamine, triethylenetetramine, tetraethylenepentamine or dipropylenetriamine, or alternatively fatty amines or polyamines, that is to say amines or polyamines containing a $C_{12}$ to $C_{18}$ alkyl or alkenyl radical connected to the nitrogen atom of an amine group.

Reactive additives of the alcohol type are, in particular, polyols, such as diols or triols and especially diols of formula $HO-R_{14}-OH$, where $R_{14}$ denotes a hydrocarbon radical, especially a $C_2$ to $C_{18}$ alkylene, $C_6$ to $C_8$ arylene and $C_6$ to $C_8$ cycloalkylene radical, and polyetherdiols of formula $HO-[C_qH_{2q}O]_r-H$, where q is a number ranging from 2 to 6 and especially equal to 2 or 3 and r is a number at least equal to 2 and, for example, ranging from 2 to 20. Examples of such polyols are ethylene glycol, propylene glycol, butylene glycol, diethylene glycol, triethylene glycol, tetraethylene glycol, hexanediol, octanediol or polyhydroxylated polybutadiene.

Reactive additives of the acid type are, in particular, polyacids of formula $HOOC-R_{14}-COOH$, where $R_{14}$ has the meaning given above. Examples of such polyacids are phthalic acid, terephthalic acid, malonic acid, succinic acid, adipic acid, glutaric acid or polycarboxylated polybutadiene.

Reactive additives of the metal salt type are, in particular, compounds, such as hydroxides, oxides, alkoxides, carboxylates, such as formates and acetates, methoxides, ethoxides, nitrites, carbonates and bicarbonates, of metals from groups I, II, III and VIII of the Periodic Table of the Elements, especially Na, K, Li, Mg, Ca, Cd, Zn, Ba, Al or Fe.

The amount of the reactive additive or of the reactive additives, which are incorporated in the reaction mixture giving rise to the bitumen/polymer components, can range from 0.01% to 10% and more particularly from 0.05% to 5% of the weight of bitumen present in the said reaction mixture.

In addition to the reactive additives and the fluxing agent, it is also possible to incorporate in the reaction mixture generating the bitumen/polymer components, at any point in the formation of the said reaction mixture, additives conventionally used in bitumen/polymer compositions, such as promoters of adhesion of the bitumen/polymer composition to mineral surfaces or alternatively fillers, such as talc, carbon black or worn tires reduced to fine powder.

In an embodiment of the preparation of the bitumen/polymer component using a hydrocarbon oil as defined above as fluxing agent, the olefinic polymer carrying epoxy or COOH functional groups and, if they are present, the additional polymer and the sulphur-donor coupling agent are incorporated in the bitumen or mixture of bitumens in the form of a mother solution of these products in the hydrocarbon oil constituting the fluxing agent.

The mother solution is prepared by bringing ingredients composing it, namely hydrocarbon oil serving as solvent, olefinic polymer containing epoxy or COOH groups and, if present, additional polymer, such as sulphur-crosslinkable elastomer, and sulphur-donor coupling agent, into contact, with stirring, at temperatures of between 10° C. and 170° C. and more particularly between 40° C. and 120° C., for a sufficient period of time, for example between 10 minutes and 2 hours, to obtain complete dissolution of the polymeric ingredients and of the coupling agent in the hydrocarbon oil.

The respective concentrations of the olefinic polymer containing epoxy or COOH groups, of the additional polymer and of the coupling agent in the mother solution can vary fairly widely, depending, in particular, on the nature of the hydrocarbon oil used to dissolve the said polymer ingredients and coupling agent. Thus, the respective amounts of functionalized olefinic polymer, of additional polymer and of coupling agent can advantageously represent 1% to 20%, 5% to 30% and 0.005% to 6% of the weight of the hydrocarbon oil.

To prepare the bitumen/polymer components by resorting to the mother solution technique, the mother solution containing the functionalized olefinic polymer and, if used, the additional polymer and the sulphurdonor coupling agent is mixed with the bitumen or mixture of bitumens, the operation being carried out at temperatures of between 100° C. and 230° C., more particularly between 120° C. and 190° C., and with stirring, this being carried out, for example, by incorporating the mother solution in the bitumen kept stirring at temperatures between 100° C. and 230° C. and more particularly between 120° C. and 190° C., and then the resulting mixture is kept stirring at temperatures of between 100° C. and 230° C., more particularly between 120° C. and 190° C., for example at the temperatures used to prepare the mixture of the mother solution with the bitumen, for a period of time at least equal to 10 minutes and generally ranging from 10 minutes to 2 hours, to form a reaction product constituting the bitumen/polymer component.

The amount of mother solution mixed with the bitumen or mixture of bitumens is chosen to yield the desired amounts, with respect to the bitumen, of olefinic polymer containing epoxy or COOH groups, of additional polymer and of sulphur-donor coupling agent, the said amounts being within the ranges defined above.

The bitumen/polymer compositions with a very low temperature susceptibility obtained by the process according to the invention can be used as is or else diluted with variable proportions of a bitumen or mixture of bitumens or of a composition according to the invention having different characteristics, in order to form bitumen/polymer binders having a chosen content of crosslinked elastomer which can either be equal to (undiluted composition) or else lower than (diluted composition) the content of crosslinked elastomer in the corresponding initial bitumen/polymer compositions. The dilution of the bitumen/polymer compositions according to the invention with the bitumen or mixture of bitumens or with a composition according to the invention with different characteristics can be carried out either directly following the preparation of the said compositions, when a virtually immediate use of the resulting bitumen/polymer binders is required, or else alternatively after a more or less prolonged period of storage of the bitumen/polymer compositions, when a delayed use of the resulting bitumen/polymer binders is envisaged. The bitumen or mixture of bitumens used for the dilution of a bitumen/polymer composition according to the invention can be chosen from the bitumens defined above as being suitable for the preparation of bitumen/polymer compositions. If appropriate, the bitumen or mixture of bitumens used for the dilution can itself have been pretreated with an acidic adjuvant according to the invention.

The dilution of a bitumen/polymer composition by a bitumen or mixture of bitumens or by a second composition according to the invention with a lower content of polymer (functionalized olefinic polymer and, if present, additional polymer), in order to form a bitumen/polymer binder with a chosen content of polymer lower than that in the bitumen/polymer composition to be diluted, is generally carried out by bringing into contact, with stirring and at temperatures of between 100° C. and 230° C. and more particularly between 120° C. and 190° C., suitable proportions of the bitumen/polymer composition to be diluted and of bitumen or mixture of bitumens or of second bitumen/polymer composition according to the invention.

The bitumen/polymer binders composed of the bitumen/polymer compositions according to the invention or resulting from the dilution of the said compositions by a bitumen or mixture of bitumens or by another bitumen/polymer composition according to the invention, up to the desired content of polymer(s) in the said binders, can be applied, directly or after conversion into aqueous emulsion, to the production of road surfacings of the surface coating type, to the production of bituminous mixes which are put in place with heating or cold, or else to the production of watertight facings.

The invention is illustrated by the following examples, given without implied limitation.

In these examples, the amounts and percentages are expressed by weight, except when otherwise indicated.

In addition, the rheological and mechanical characteristics of the bitumens or bitumen/polymer compositions to which reference is made in the said examples, namely penetrability, ring-and-ball softening point and Pfeiffer number (PN), are those defined above.

EXAMPLES 1 TO 9

Bituminous (Example 1) or bitumen/polymer (Examples 2, 4, 6 and 8) control compositions were prepared, as well as bitumen/polymer compositions according to the invention (Examples 3, 5, 7 and 9), in order to evaluate and compare the physicomechanical characteristics thereof.

The preparations were carried out under the following conditions

Example 1

(Control)

Preparation of a bituminous composition composed of a bitumen modified by an acidic adjuvant.

1000 parts of a bitumen having a penetrability, determined according to the conditions of NF Standard T 66004, within the range 70/100 and 5 parts of 75% phosphoric acid were introduced into a reactor maintained at 175° C. and with stirring. The contents of the reactor were subsequently maintained at 175° C. with stirring for a period of time equal to 3 hours, in order to produce the bituminous composition.

Example 2

(Control)

Preparation of a bitumen/polymer composition untreated by an acidic adjuvant.

980 parts of a bitumen identical to that used in Example 1, as well as 20 parts of an ethylene/methyl acrylate/glycidyl methacrylate terpolymer containing 24% of methyl arcrylate and 8% of glycidyl methacrylate and possessing a melt flow index, determined according to ASTM Standard D 1238, having a value equal to 6 g per 10 minutes, were introduced into a reactor maintained at 175° C. and with stirring. After mixing for 2.5 hours with stirring at 175° C., a homogeneous mass constituting the bitumen/polymer composition was obtained.

Example 3

(According to the Invention)

Preparation of a bitumen/polymer composition by treating a non-crosslinked bitumen/polymer component with an acidic adjuvant.

980 parts of a bitumen identical to that used in Example 1, as well as 20 parts of the terpolymer used in Example 2, were introduced into a reactor maintained at 175° C. and with stirring, and the whole mixture was kept stirring at 175° C. for 2.5 hours.

5 parts of 75% phosphoric acid were then added to the contents of the reactor and the whole mixture was subsequently maintained at 175° C. with stirring for 3 hours, in order to form the bitumen/polymer composition.

Example 4

(Control)

Preparation of a non-crosslinked bitumen/polymer composition including an elastomer, which composition is not treated with an acidic adjuvant.

955 parts of a bitumen identical to that used in Example 1 and then 30 parts of an elastomer composed of a styrene/butadiene/styrene triblock copolymer, having an average molecular mass of 150,000 daltons and containing 30% of styrene, and 15 parts of the terpolymer used in Example 2 were introduced into a reactor maintained at 175° C. and with stirring. The contents of the reactor were subsequently kept stirring at 175° C. for 2.5 hours in order to form the non-crosslinked bitumen/polymer composition.

Example 5

(According to the Invention)

Preparation of a non-crosslinked bitumen/polymer composition including an elastomer, which composition is treated with an acidic adjuvant. A non-crosslinked bitumen/polymer composition including an elastomer, the so-called bitumen/polymer component, was prepared using the procedure described in Example 4. 4 parts of a polyphosphoric acid were then incorporated in the contents of the reactor and then the reaction mixture thus formed was maintained at 175° C. and with stirring for a period of time equal to 2.5 hours, in order to produce the bitumen/polymer composition according to the invention. The polyphosphoric acid used corresponded to the formula $P_nH_{n+2}O_{3n+1}$, n being a number equal to approximately 3.

Example 6

(Control)

Preparation of a non-crosslinked bitumen/polymer composition which is not treated with an acidic adjuvant.

A bitumen/polymer composition was prepared using the procedure described in Example 2, with, however, use of a bitumen having a penetrability within the range 180/220.

Example 7

(According to the Invention)

Preparation of a bitumen/polymer composition by treating a bitumen/polymer component with an acidic adjuvant.

A non-crosslinked bitumen/polymer composition, the so-called bitumen/polymer component, was prepared using the procedure described in Example 6.3 parts of methanesulphonic acid were then incorporated in the contents of the reactor and then the whole mixture was maintained at 175° C., with stirring, for a period of time of 3 hours, in order to produce the bitumen/polymer composition according to the invention.

Example 8

(Control)

Preparation of a crosslinked bitumen/polymer composition which is not treated with an acidic adjuvant.

960 parts of a bitumen identical to that used in Example 6 and then 30 parts of an elastomer composed of a styrene/butadiene diblock copolymer, having an average molecular mass of 100,000 daltons and a styrene content of 25%, and 10 parts of the terpolymer used in Example 2 were introduced into a reactor maintained at 175° C. and with stirring, and the reaction mixture thus formed was kept stirring at 175° C. for 2.5 hours. 0.8 part of sulphur was then added to the contents of the reactor and the whole mixture was kept stirring at 175° C. for 3 hours, in order to form a crosslinked bitumen/polymer composition.

Example 9

(According to the Invention)

Preparation of a crosslinked bitumen/polymer composition which is treated with an acidic adjuvant.

A sulphur-crosslinked bitumen/polymer composition, the so-called crosslinked bitumen/polymer component, was prepared using the procedure described in Example 8. 5 parts of 98% sulphuric acid were then incorporated in the contents of the reactor and then the reaction mixture thus formed was maintained at 175° C. and with stirring for a period of time of 2.5 hours, in order to produce the crosslinked bitumen/polymer composition treated with an acidic adjuvant according to the invention.

For each of the compositions obtained as indicated in Examples 1 to 9, the following characteristics were determined:

penetrability at 25° C. (Pen.), ring-and-ball softening temperature (RBT),

Pfeiffer number (PN).

The results obtained are collated in the table below.

In this table, the abbreviations BT1, BT2, TPO, SBS and SB have the following meanings:

BT1: unmodified bitumen with a penetrability within the range 70/100;

BT2: unmodified bitumen with a penetrability within the range 180/220,

TPO: ethylene/methyl acrylate/glycidyl methacrylate terpolymer used in Examples 2, 3, 4, 5, 6, 7, 8 and 9;

SBS: styrene/butadiene/styrene triblock copolymer used in Examples 4 and 5;

SB: styrene/butadiene diblock copolymer used in Examples 8 and 9.

The contents of TPO, SBS and SB in the compositions are expressed as percentages by weight of the overall amounts of bitumen and polymer(s).

The sulphur content is expressed as % of the weight of the bitumen.

TABLE

| Examples | Nature of the acidic adjuvant | TPO (%) | SBS (%) | SB (%) | Sulphur (%) | Pen (1/10 mm) | RBT (° C.) | PN |
|---|---|---|---|---|---|---|---|---|
| BT1 | | | | | | 90 | 46 | −0.8 |
| 1 | Phosphoric acid | | | | | 75 | 53 | 0.6 |
| 2 | No acidic adjuvant | 2 | | | | 85 | 55 | 1.4 |
| 3 | Phosphoric acid | 2 | | | | 60 | 69.4 | 3.2 |
| 4 | No acidic adjuvant | 1.5 | 3 | | | 55 | 65 | 2.2 |
| 5 | Polyphosphoric acid | 1.5 | 3 | | | 45 | 76 | 3.5 |
| BT2 | | | | | | 190 | 40.9 | 0.12 |
| 6 | No acidic adjuvant | 2 | | | | 139 | 50 | 1.9 |
| 7 | Methanesulphonic acid | 2 | | | | 93 | 58.9 | 2.6 |
| 8 | No acidic adjuvant | 1 | | 3 | 0.1 | 118 | 60 | 3.7 |
| 9 | $H_2SO_4$ | 1 | | 3 | 0.1 | 75 | 72 | 4.3 |

In the light of the characteristics collated in the table, it is apparent that:

- the incorporation of a functionalized olefinic polymer according to the invention, for example olefinic polymer carrying epoxy groups, in a bitumen improves the physical properties of the said bitumen (increase in the RBT value and in the Pfeiffer number), as is evident from the comparison of Example 2 with BT1 or of Example 6 with BT2;
- the addition of an acidic adjuvant according to the invention to a bitumen also reinforces the consistency of the bitumen (increase in the RBT value and in the Pfeiffer number), as is evident from the comparison of Example 1 with BT1;
- the addition of an acidic adjuvant according to the invention to a bitumen modified by a functionalized olefinic polymer according to the invention, for example olefinic polymer carrying epoxy groups, results in an increased reinforcement of the physical properties of the composition (greater increase in the RBT value and in the Pfeiffer number than in the preceding case) by a phenomenon of synergy between the two modification agents, namely functionalized olefinic polymer and acidic adjuvant, as is evident emerges from the comparison of the results of Example 3 with the results of Control Examples 1 and 2;
- the abovementioned synergy effect is magnified when the bitumen/polymer component treated with the acidic adjuvant contains an elastomer in addition to the functionalized olefinic polymer, as may be seen in the comparison of the results of Example 5 according to the invention with the results of Control Example 4;
- the magnified synergy effect is even more marked if the bitumen/polymer composition containing an elastomer, which is subjected to the treatment with the acidic adjuvant, has been subjected to crosslinking with sulphur prior to the said treatment, as is evident from the comparison of the results of Example 9 according to the invention with the results of Control Example 8.

We claim:

1. Process for the preparation of bitumen/polymer compositions in which a bitumen or mixture of bitumens is brought into contact, the operation being carried out at temperatures between 100° C. and 230° C. and with stirring for a time of at least 10 minutes, with, with respect to the weight of the bitumen or mixture of bitumens, 0.01% to 20% of at least one olefinic polymer carrying epoxy or COOH functional groups, in order to form a so-called bitumen/polymer component reaction product, the said process comprising maintaining the bitumen/polymer component at temperatures of between 100° C. and 230° C. and with stirring, incorporating 0.005% to 6%, by weight of the bitumen or mixture of bitumens, of an acidic adjuvant and the reaction mixture thus formed is maintained at temperatures of between 100° C. and 230° C. and with stirring for a time of at least 10 minutes in order to produce the bitumen/polymer composition, the said acidic adjuvant being composed of one or more compounds selected from the group consisting of phosphoric acids, boric acids, sulphuric acid, the anhydrides of the said acids, chlorosulphuric acid, polyphosphoric acids, phosphonic acids of formula

and acids of formula R—(COO)$_t$—SO$_3$H with, in the said formulae, t taking the value of zero or one and R denoting a monovalent hydrocarbon radical selected from the group consisting of $C_1$ to $C_6$ acyclic monovalent hydrocarbon radicals and cyclic monovalent hydrocarbon radicals containing 4 to 12 cyclic carbon atoms and optionally substituted by $C_1$ to $C_{16}$ acyclic monovalent hydrocarbon radicals.

2. Process according to claim 1, wherein the total amount of acidic adjuvant incorporated in the bitumen/polymer component represents 0.01% to 3% by weight of the bitumen or mixture of bitumens.

3. Process according to claim 1 wherein the acidic adjuvant is selected from the group consisting of $H_3PO_4$, $P_2O_5$, $H_3BO_3$, $B_2O_3$, $H_2SO_4$, $SO_3$, $HSO_3Cl$, polyphosphoric acids, mixtures of at least one polyphosphoric acid and of sulphuric acid, mixtures of at least one polyphosphoric acid and of at least one acid R—(COO)$_t$—SO$_3$H, mixtures of sulphuric acid and of at least one acid R—(COO)$_t$—SO$_3$H, and mixtures of sulphuric acid with at least one polyphosphoric acid and at least one acid R—(COO)$_r$—SO$_3$H.

4. Process according to claim 3, wherein the acidic adjuvant is composed of a combination comprising, by weight, from 20% to 95% of one or more polyphosphoric acids and from 80% to 5% of sulphuric acid and/or of methanesulphonic acid.

5. Process according to claim 1 wherein the polyphosphoric acids are compounds of formula P$_q$H$_r$O$_s$ in which q, r and s are positive numbers such that q≧2 and that 5q+r−2s=0.

6. A process according to claim 1, wherein the acids R—(COO)$_r$—SO$_3$H are such that R is a linear or branched C$_1$ to C$_{16}$ alkyl radical, a C$_4$ to C$_{12}$ cycloalkyl radical or alternatively, a monovalent aromatic radical having 6 cyclic atoms and which can optionally be substituted by a linear or branched C$_1$ to C$_{16}$ alkyl radical.

7. Process according to claim 1 wherein the amount of olefinic polymer carrying epoxy or COOH functional groups brought into contact with the bitumen or mixture of bitumens in order to form the bitumen/polymer component represents 0.05% to 10% of the weight of bitumen or mixture of bitumens.

8. Process according to claim 1 wherein the olefinic polymer carrying epoxy or COOH groups is chosen from copolymers containing, by weight, x % of units resulting from ethylene or from propylene, y % of units resulting from one or more monomers A of formula

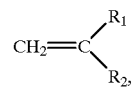

z % of units resulting from at least one monomer B of formula

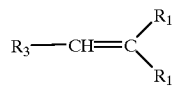

and v % of units resulting from one or more monomers C other than the monomers A and B, with, in these formulae, R$_1$ denoting H, CH$_3$ or C$_2$H$_5$, R$_2$ representing a —COOR$_5$, —OR$_5$ or —OOCR$_6$ radical with R$_5$ denoting a C$_1$ to C$_{10}$ alkyl radical and R$_6$ representing H or a C$_1$ to C$_3$ alkyl radical, R$_3$ denoting H, COOH or COOR$_5$, R$_5$ having the abovementioned definition,

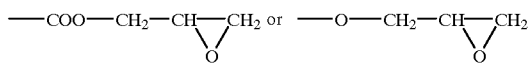

and R$_4$ denoting a —COOH,
radical and x, y, z and v being numbers such that 40≦x=≦99.9, 0≦y≦50, 0.1≦z≦20 and 0≦v≦15 with x+y+z+v=100.

9. Process according to claim 8, wherein in the olefinic polymer containing epoxy or COOH groups, x, y, z and v are such that 50≦x≦99.5, 0≦y≦40, 0.5≦z≦15 and 0≦v≦10 with x+y+z+v=100.

10. Process according to claim 8 wherein the monomers A are selected from the group consisting of vinyl formate vinyl acetate, vinyl propionate, vinyl butyrate, vinyl ethers CH$_2$=CH—O—R$_5$, alkyl acrylates of formula CH$_2$=CH—COOR$_5$ and alkyl methacrylates of formula

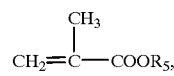

R$_5$ being a C$_1$ to C$_{10}$ alkyl radical.

11. Process according to claim 8 wherein the monomers B are selected from the group consisting of maleic acid and its anhydride, acrylic acid, methacrylic acid, alkyl hydrogen maleates of formula HOOC—CH=CH—COOR$_7$ where R$_7$ is a C$_1$ to C$_6$ alkyl radical, glycidyl acrylate, glycidyl methacrylate or glycidyl vinyl ether.

12. Process according to claim 8 wherein the monomers C are selected from the group consisting of CO, SO$_2$ and acrylonitrile.

13. Process according to claim 8 wherein the olefinic polymers containing epoxy or COOH groups have a melt flow index, determined according to ASTM Standard D 1238, having a value, expressed in grams per 10 minutes, of between 0.3 and 3000.

14. Process according to claim 1 wherein the bitumen or mixture of bitumens is chosen from bitumens having a kinematic viscosity at 100° C. of between 0.5×10$^{-4}$ m$^2$/s and 3×10$^{-2}$ m$^2$/s.

15. Process according to claim 14, wherein the bitumen or mixture of bitumens exhibits a penetrability at 25° C., defined according to NF Standard T 66004, of between 5 and 800.

16. Process according to claims 1 wherein one or more additional polymers other than the olefinic polymers containing epoxy or COOH groups are incorporated in the bitumen/polymer component during its preparation.

17. Process according to claim 16, wherein the said additional polymers are sulphur-crosslinkable elastomers.

18. Process according to claim 17, wherein the amount of sulphur-crosslinkable elastomer represents between 0.3% and 20% of the weight of the bitumen or mixture of bitumens.

19. Process according to claim 17, wherein the sulphur-crosslinkable elastomers are random or block copolymers of styrene and of a conjugated diene.

20. Process according to claim 17, wherein the copolymers of styrene and of conjugated diene contain, by weight, 5% to 50% of styrene.

21. Process according to claim 17, wherein the weight-average molecular weight of the copolymer of styrene and of conjugated diene is between 10,000 and 600,000 daltons.

22. Process according to claim 17 wherein the bitumen/polymer component, based on bitumen or mixture of bitumens, on olefinic polymer containing epoxy or COOH groups and on sulphur-crosslinkable elastomer, is subjected to crosslinking under the action of a sulphur-donor coupling agent, in order to produce a crosslinked bitumen/polymer component.

23. Process according to claim 22, wherein the sulphur-donor coupling agent is selected from the group consisting of the group formed by elemental sulphur, hydrocarbyl polysulphides, sulphur-donor vulcanization accelerators or mixtures of such products with one another and/or with vulcanization accelerators which are not sulphur donors.

24. Process according to claim 23, wherein the sulphur-donor coupling agent is selected from the group consisting of the products M, which contain, by weight, from 0% to 100% of a component CA composed of one or more sulphur-donor vulcanization accelerators and from 100% to 0% of a component CB composed of one or more vulcanization agents chosen from elemental sulphur and hydrocarbyl polysulphides, and the products N, which contain a component CC composed of one or more vulcanization accelerators which are not sulphur donors and a product M in a ratio by weight of the component CC to the product M ranging from 0.01 to 1.

25. Process according to claim 22, wherein the coupling agent is used in an amount appropriate for providing an amount of free sulphur representing 0.1% to 20% of the weight of sulphur-crosslinkable elastomer in the bitumen/polymer component subjected to crosslinking.

26. Process according to claim 1 wherein the bitumen/polymer component is prepared by bringing the olefinic polymer or polymers carrying epoxy or COOH groups and, in the event of use, the additional polymer or polymers, into contact with the bitumen or mixture of bitumens, in the desired proportions, the operation being carried out at temperatures of between 100° C. and 230° C., and with stirring, for a period of time of at least 10 minutes.

27. Process according to claim 22 wherein the crosslinked bitumen/polymer component is prepared by bringing the olefinic polymer or polymers carrying epoxy or COOH groups and the sulphur-crosslinkable elastomer or elastomers into contact with the bitumen or mixture of bitumens, in the desired proportions, the operation being carried out at temperatures of between 100° C. and 230° C., and with stirring, for a period of time of at least 10 minutes the sulphur-donor coupling agent is then incorporated, in the desired amount, in the product obtained, which constitutes the non-crosslinked bitumen/polymer component, and the whole mixture is kept stirring at temperatures of between 100° C. and 230° C., for a period of time of at least 10 minutes, to form a reaction mass constituting the crosslinked bitumen/polymer component.

28. Process according to claim 26 wherein the acidic adjuvant is incorporated, in the desired amount, in the non-crosslinked or crosslinked bitumen/polymer component, the operation being carried out at temperatures of between 100° C. and 230° C., and with stirring, and then the whole mixture being maintained at temperatures of between 100° C. and 230° C., and with stirring, for a period of time of at least 10 minutes to produce the bitumen/polymer composition.

29. Process according to claim 26, wherein, during its formation, the cross-linked bitumen/polymer component or the non-crosslinked bitumen/polymer component, which is subsequently subjected to the action of the acidic adjuvant, has added to it 1% to 40% by weight of the bitumen, of a fluxing agent.

30. Process according to claim 29, wherein the fluxing agent is composed of a hydrocarbon oil which has an atmospheric pressure distillation range, determined according to ASTM Standard D 86-67, of between 100° C. and 600° C., the said hydrocarbon oil being, a petroleum cut of aromatic nature, a petroleum cut of naphtheno-aromatic nature, a petroleum cut of naphtheno-paraffinic nature, a petroleum cut of paraffinic nature, a coal oil or alternatively an oil of plant origin.

31. Process according to claim 30, wherein the olefinic polymer or polymers carrying epoxy or COOH groups and, if they are present, the additional polymer or polymers and the coupling agent are incorporated in the bitumen or mixture of bitumens in the form of a mother solution of these products in the hydrocarbon oil constituting the fluxing agent.

32. Process according to claim 31, wherein the mother solution contains, by weight of the hydrocarbon oil, 1% to 20% of the olefinic polymer or polymers containing epoxy or COOH groups and, in the event of use, 5% to 30% of the additional polymer or polymers and 0.005% to 6% of coupling agent.

33. Process according to claim 31, wherein the mother solution is mixed with the bitumen or mixture of bitumens, the operation being carried out at temperatures of between 100° C. and 230° C., and with stirring, and then the resulting mixture is kept stirring at temperatures of between 100° C. and 230° C., for a period of time of at least 10 minutes to produce the bitumen/polymer component.

34. Process according to claim 1 wherein during its preparation, the bitumen/polymer component which is subjected to the treatment with the acidic adjuvant, has added to it one or more additives capable of reacting with the functional groups of the olefinic polymer or polymers containing epoxy or COOH groups which it contains, the said reactive additives being primary or secondary amines, alcohols or polyols, acids or polyacids, or alternatively metal salts of metals from groups I, II, III and VIII of the Periodic Table of the Elements.

35. Process according to claim 34, wherein the amount of reactive additive or of reactive additives incorporated in the reaction mixture giving rise to the bitumen/polymer component represents 0.01% to 10% and of the weight of the bitumen or mixture of bitumens.

36. A process according to, claim 8, wherein the olefinic polymers containing epoxy or COOH groups are selected from the group consisting of:
  (a) random copolymers of ethylene and of a monomer B selected from the group consisting of acrylic acid, methacrylic acid, maleic acid, maleic anhydride, glycidyl acrylate and glycidyl methacrylate which contain, by weight, 80% to 99.7% of ethylene;
  (b) random terpolymers of ethylene, of a monomer A selected from the group consisting of vinyl acetate, alkyl acrylates containing a $C_1$ to $C_6$ alkyl residue and alkyl methacrylates containing a $C_1$ to $C_6$ alkyl residue, and of a monomer B selected from the group consisting of acrylic acid, methacrylic acid, maleic acid, maleic anhydride, glycidyl acrylate and glycidyl methacrylate, which contain, by weight, 0.5% to 40% of units resulting from the monomer A and 0.5% to 15% of units resulting from the monomer B, the remainder being formed of units resulting from ethylene; and
  (c) copolymers resulting from the grafting of a monomer B selected from the group consisting of acrylic acid, methacrylic acid, maleic acid, maleic anhydride, glycidyl acrylate and glycidyl methacrylate, on a substrate composed of a polymer selected from the group consisting of polyethylenes, polypropylenes, random copolymers of ethylene and of vinyl acetate, random copolymers of ethylene and of an alkyl acrylate containing a $C_1$ to $C_6$ alkyl residue and random copolymers of ethylene and of an alkyl methacrylate containing a $C_1$ to $C_6$ alkyl residue, which random copolymers contain by weight, 40% to 99.7% of ethylene, said grafted copolymers containing, by weight, 0.5% to 15% of grafted units resulting from the monomer B.

37. Process according to claim 36, wherein the olefinic polymers containing epoxy or COOH groups are selected from the group consisting of:
  (i) random terpolymers of ethylene, of alkyl acrylate or methacrylate containing a $C_1$ to $C_6$ alkyl residue, and of maleic anhydride which contain, by weight, 0.5% to 40% of units resulting from alkyl acrylate or methacrylate and 0.5% to 15% of units resulting from maleic anhydride, the remainder being formed of units resulting from ethylene;

(ii) random terpolymers of ethylene, of alkyl acrylate or methacrylate containing a $C_1$ to $C_6$ alkyl residue, and of glycidyl acrylate or methacrylate which contain, by weight, 0.5% to 40% of units resulting from alkyl acrylate or methacrylate and 0.5% to 15% of units resulting from glycidyl acrylate or methacrylate, the remainder being formed of units resulting from ethylene;

(iii) low density polyethylenes grafted with maleic anhydride and polypropylenes grafted with maleic anhydride which contain, by weight, 0.5% to 15% of grafted units resulting from maleic anhydride;

(iv) low density polyethylenes grafted with glycidyl acrylate or methacrylate and polypropylenes grafted with glycidyl acrylate or methacrylate which contain, by weight, 0.5% to 15% of grafted units resulting from the glycidyl derivative.

38. A process for the preparation of bitumen/polymer compositions exhibiting a very low temperature susceptibility in which a bitumen or mixture of bitumens is brought into contact, the operation being carried out at temperatures between 100° C. and 230° C. and with stirring for a time of at least 10 minutes, with, based on the weight of the bitumen or mixture of bitumens, 0.01% to 20% of at least one olefinic polymer carrying epoxy or COOH functional groups and between 0.3% and 20% of a sulphur-crosslinkable elastomer to form a bitumen/polymer component and said bitumen/polymer component is subjected to crosslinking under the action of a sulphur-donor coupling agent, to produce a crosslinked bitumen/polymer component, said process comprising maintaining the crosslinked bitumen/polymer component at temperatures of between 100° C. and 230° C. and with stirring, incorporating into said crosslinked component from 0.005% to 6%, by weight of the bitumen or mixture of bitumens, or an acidic adjuvant to form a reaction mixture and maintaining said reaction mixture at temperatures between 100° C. and 230° C. and with stirring for a time of at least 10 minutes, in order to produce the bitumen/polymer composition, said acidic adjuvant being composed of one or more compounds selected from the group consisting of phosphoric acids, boric acids, sulphuric acid, the anhydrides of said acids, chlorosulphuric acid, polyphosphoric acids, phosphonic acids of the formula

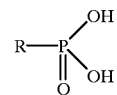

and acids of formula R—(COO)$_t$—SO$_3$H with, in the said formulae, t taking the values of zero or one and R denoting a monovalent hydrocarbon radical selected from the group consisting of $C_1$ to $C_{16}$ acyclic monovalent hydrocarbon radicals and cyclic monovalent hydrocarbon radicals containing 4 to 12 cyclic carbon atoms and optionally substituted by $C_1$ to $C_{16}$ acyclic monovalent hydrocarbon radicals.

39. A coating composition comprised of a bitumen/polymer binder composed of the bitumen/polymer compositions of claim 38.

40. A road surface coating comprised of the coating composition of claim 39.

41. Watertight facings comprised of the coating compositions of claim 39.

42. A process according to claim 22, wherein, during its preparation, the crosslinked bitumen/polymer component, which is subjected to the treatment with the acidic adjuvant, has added to it one or more additives capable of reacting with the functional groups of the olefinic polymer or polymers containing epoxy or COOH groups which it contains, said reactive additives being selected from the group consisting of primary amines or secondary amines, polyamines, alcohols, polyols, acids, or alternatively metal salts of metals from groups I, II, III, or VIII of the Periodic Table of the Elements.

43. A process according to claim 5, wherein the polyphosphoric acids have the formula:

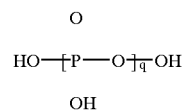

wherein q is a positive number such that q≧2.

* * * * *

UNITED STATES PATENT AND TRADEMARK OFFICE
CERTIFICATE OF CORRECTION

PATENT NO. : 6,011,095
DATED : January 4, 2000
INVENTOR(S) : Jean Pascal Planche, et al.

It is certified that error appears in the above-identified patent and that said Letters Patent is hereby corrected as shown below:

Column 1, lines 35: the term "$\varepsilon_y$" should read --$\varepsilon_b$--

Column 5, lines 40, 41 and 43: all the signs "<" should read -- $\leq$ --

Column 9, line 64: delete "Y"

Column 17, line 52: delete "is evident"

Column 18, line 53: "$C_6$" should read --$C_{16}$--

Column 19, line 40: the lower radical "$R_-$" of the formula should read --$R_4$--;

lines 50-55: the sentence "and $R_4$ denoting a -COOH" should be placed at line 50 before the two radicals containing an epoxy group

Column 20, line 29: the word "claims" should read --claim--

Column 22, line 23: delete "and"

UNITED STATES PATENT AND TRADEMARK OFFICE
CERTIFICATE OF CORRECTION

PATENT NO. : 6,011,095

DATED : January 4, 2000

INVENTOR(S) : Jean Pascal Planche, et al.

It is certified that error appears in the above-identified patent and that said Letters Patent is hereby corrected as shown below:

Column 23, line 35: "or" should read --of--

Column 24, line 30: "metal salts" should read --salts--

Claims 20 and 21: should be dependent on Claim 19

Signed and Sealed this

Twentieth Day of February, 2001

NICHOLAS P. GODICI

Attest:

Attesting Officer

Acting Director of the United States Patent and Trademark Office